(12) United States Patent
Konyashin et al.

(10) Patent No.: US 10,946,445 B2
(45) Date of Patent: Mar. 16, 2021

(54) METHOD OF MANUFACTURING A CEMENTED CARBIDE MATERIAL

(71) Applicant: ELEMENT SIX GMBH, Burghaun (DE)

(72) Inventors: Igor Yurievich Konyashin, Burghaun (DE); Bernd Heinrich Ries, Burghaun (DE); Hauke Hinners, Burghaun (DE)

(73) Assignee: Element Six GmbH, Burghaun (DE)

( * ) Notice: Subject to any disclaimer, the term of this patent is extended or adjusted under 35 U.S.C. 154(b) by 194 days.

(21) Appl. No.: 16/064,923

(22) PCT Filed: Dec. 19, 2016

(86) PCT No.: PCT/EP2016/081652
§ 371 (c)(1),
(2) Date: Jun. 21, 2018

(87) PCT Pub. No.: WO2017/108653
PCT Pub. Date: Jun. 29, 2017

(65) Prior Publication Data
US 2019/0001414 A1    Jan. 3, 2019

(30) Foreign Application Priority Data
Dec. 21, 2015 (GB) ...................................... 1522503

(51) Int. Cl.
*B22F 3/105* (2006.01)
*C22C 1/05* (2006.01)
*C22C 29/06* (2006.01)
*B33Y 70/00* (2020.01)
(Continued)

(52) U.S. Cl.
CPC ............ *B22F 3/1055* (2013.01); *B22F 3/008* (2013.01); *B33Y 10/00* (2014.12); *B33Y 70/00* (2014.12);
(Continued)

(58) Field of Classification Search
CPC .............................. B22F 3/1055; B33Y 10/00
See application file for complete search history.

(56) References Cited

U.S. PATENT DOCUMENTS

| 4,395,279 A | 7/1983 | Houck |
| 2003/0000339 A1 | 1/2003 | Findeisen et al. |

(Continued)

FOREIGN PATENT DOCUMENTS

| CN | 101045971 A | 10/2007 |
| CN | 104711442 A | 6/2015 |

(Continued)

OTHER PUBLICATIONS

Gu et al., "Laser additive manufacturing of metallic components: materials, processes and mechanisms", International Materials Reviews, 2012, pp. 133-164, vol. 57, No. 3, Institute of Materials, Minerals and Mining and ASM International.

(Continued)

*Primary Examiner* — Nathan T Leong
(74) *Attorney, Agent, or Firm* — Dean W. Russell; Clark F. Weight; Kilpatrick Townsend & Stockton LLP

(57) ABSTRACT

A method of fabricating a cemented carbide article by additive manufacturing, and a granular material are disclosed. A precursor material is provided that comprises granules, the granules comprising carbide grains and a binder comprising any of cobalt, nickel and iron. Each granule has a density of at least 99.5% of the theoretical density and the granules of the precursor material have a mean compressive strength of at least 40 megapascals (MPa). An additive manufacturing process is used to manufacture the article by building up successive layers of material derived from the precursor material.

21 Claims, 4 Drawing Sheets

(51) Int. Cl.
  *B33Y 10/00* (2015.01)
  *B22F 3/00* (2021.01)
  *C23C 4/00* (2016.01)
  *C23C 24/10* (2006.01)

(52) U.S. Cl.
  CPC .............. *C22C 1/051* (2013.01); *C22C 29/06* (2013.01); *C23C 4/00* (2013.01); *C23C 24/10* (2013.01); *B22F 2302/10* (2013.01); *B22F 2998/10* (2013.01); *C22C 2204/00* (2013.01)

(56) References Cited

U.S. PATENT DOCUMENTS

2010/0279007 A1 11/2010 Briselden et al.
2014/0298728 A1* 10/2014 Keshavan ............... E21B 10/56
  51/298

FOREIGN PATENT DOCUMENTS

| | | |
|---|---|---|
| WO | 2006001791 A1 | 1/2006 |
| WO | 2015162206 A2 | 10/2015 |
| WO | 2015181077 A1 | 12/2015 |

OTHER PUBLICATIONS

Xiong et al., "Investigation of Tungsten Carbide and Titanium Carbide Based Cermets", Believed to be published at least as early as Mar. 8, 2016, pp. 1-7, University of California, Department of Chemical Engineering and Materials Science, Davis, https://globalhub.org/resources/1058/download/Y.Xiong.pdf.

Picas et al., "Microstructure and wear resistance of WC-Co by three consolidation processing techniques", Int. Journal of Refractory Metals & Hard Materials, 2009, pp. 344-349, vol. 27, Elsevier Ltd.

United Kingdom Patent Application No. GB1522503.0, Combined Search and Examination Report dated Mar. 16, 2016, 10 pages.

United Kingdom Patent Application No. GB1621544.4, Combined Search and Examination Report dated Jan. 5, 2017, 7 pages.

International Patent Application No. PCT/EP2016/081652, International Search Report and Written Opinion dated Apr. 4, 2017, 17 pages.

* cited by examiner

S1. Provide granular precursor material including carbide grains and binder, granules having density at least 99.5% theoretical density and mean compressive strength 40 MPa S2. Use granules in additive manufacturing process to fabricate cemented carbide article

METHOD OF MANUFACTURING A CEMENTED CARBIDE MATERIAL

FIELD OF THE INVENTION

This disclosure relates generally to methods of manufacturing a cemented carbide article by additive manufacturing and to precursor materials for cemented carbide articles.

BACKGROUND

Additive manufacturing is a powerful tool for rapid prototyping and fabricating metal articles having a complicated geometry. This method is known to be used almost solely for the manufacture of articles consisting of pure metals and alloys, such as steels and titanium alloys. Gu et al., 'Laser additive manufacturing of metallic components: materials, processes and mechanisms', International Materials Reviews, 2012, V. 57, N. 3, 133 reviews the process of additive manufacturing of metallic components.

Additive manufacturing processes are rarely used for the industrial production of articles consisting of composite materials consisting of more than one phase. In particular, additive manufacturing is not used for production of cemented carbide materials. Cemented carbide materials comprise particles of carbide such as tungsten carbide (WC) or titanium carbide (TiC) dispersed within a binder material comprising a metal such as cobalt (Co), nickel (Ni) or metal alloy. The binder phase may be said to cement the carbide particles together as a sintered compact. It may be that additive manufacturing processes are not used for cemented carbides because of difficulties related to the densification of materials, which are only partially melted during the additive manufacturing process for short times. The employment of extremely high energies and consequently high temperatures needed for obtaining high densities of cemented carbides is limited by the low density and strength of cemented carbide granules not subjected to liquid-phase sintering, which are usually utilized as precursors for additive manufacturing of cemented carbides. Such granules cannot be sintered to high-dense bulk materials in the short time required for additive manufacturing, and can be easily destroyed by "exploding" as a result of thermal shocks caused by the impact of high-energy electron or laser beams during additive manufacturing.

WO2015/162206A2 discloses the use of fully sintered cemented carbide granulates obtained by liquid-phase sintering in order to address the problems described above. To reduce the risk of sintering green cemented carbide granules together, "sintering inhibitor powders" are added. These powders consist of oxide ceramics or graphite added to green granulates before liquid phase sintering. However, a disadvantage of this approach is that there is a significant risk of contamination of the cemented carbide granulates by the sintering inhibitor powders. Furthermore, the addition of such powders reduces the strength of the cemented carbide granulates.

SUMMARY

It is an object to provide methods of manufacturing of cemented carbide articles using an additive manufacturing process.

According to a first aspect, there is provided a method of fabricating a cemented carbide article by additive manufacturing. A precursor material is provided that comprises granules, the granules comprising carbide grains and a binder comprising any of cobalt, nickel and iron. Each granule has a density of at least 99.5% of the theoretical density and the granules of the precursor material have a mean compressive strength of at least 40 megapascals (MPa). An additive manufacturing process is used to manufacture the article by building up successive layers of material derived from the precursor material.

As an option, each granule of the precursor material has a density selected from any of at least 99.7% of the theoretical density, at least 99.9% of the theoretical density, and 100% of the theoretical density.

The granules of the precursor material optionally have a mean compressive strength selected from any at least 60 MPa, and at least 100 MPa.

The granules of the precursor material optionally have sizes selected from any of between 20 microns and 200 microns, between 30 microns and 120 microns, and between 40 microns and 90 microns.

According to a first exemplary option, providing the granules of the precursor material comprises milling a cemented carbide powder mixture in an organic fluid with a plasticizing agent to obtain a slurry, drying the slurry to obtain a cemented carbide powder, and granulating the cemented carbide powder to obtain cemented carbide granules. The granules are solid-state sintered at a temperature between 1000° C. and 1250° C. for between 1 and 60 min in a vacuum or protective atmosphere to obtain a pre-sintered granulated powder. The pre-sintered granules are screened (for example by sieving) to obtain a required size fraction of the pre-sintered granules. The pre-sintered granules are sintered at a temperature between 1260° C. and 1330° C. for between 2 and 20 min in a vacuum or protective atmosphere to obtain an aggregation of sintered granules. The aggregation is broken up to separate fully sintered granules. The fully sintered granules are screened to obtain a required size fraction.

As an option, the method comprises spray drying the slurry to dry and granulate the cemented carbide granules. Alternatively, the cemented carbide powder is optionally granulated by use of rolling in a rotated drum at a temperature above 50° C.

According to a second exemplary option, providing the granules of the precursor material comprises milling a cemented carbide powder mixture in an organic fluid with a plasticizing agent to obtain a slurry, drying the slurry to obtain a cemented carbide powder, pressing the cemented carbide powder to form a green body, breaking up the green body for form green body granules, screening the green body granules to obtain a required size fraction of the green body granules, sintering the green body granules at a temperature between 1260° C. and 1330° C. for between 2 and 20 min in a vacuum or protective atmosphere to obtain an aggregation of fully sintered granules, breaking up the aggregation to obtain separate fully sintered granules, and screening the fully sintered granules to obtain a required size fraction.

According to a third exemplary option, providing the granules of the precursor material comprises milling a cemented carbide powder mixture in an organic fluid with a plasticizing agent to obtain a slurry, drying the slurry to obtain a cemented carbide powder, granulating the cemented carbide powder to obtain cemented carbide granules, screening the granules to obtain a required size fraction of the granules, sintering the granules at a temperature between 1260° C. and 1330° C. for between 2 and 20 min in a vacuum or protective atmosphere to obtain an aggregation of fully sintered granules, breaking up the aggregation to obtain separate fully sintered granules and screening the fully sintered granules to obtain a required size fraction.

As an option, the method comprises subsequent to sintering the pre-sintered granules, hot isostatic pressing the fully sintered granules in argon at pressure of between 0.5 and 10 MPa.

The cemented carbide article optionally has a density selected from any of at least 97% of theoretical density, at least 98% of theoretical density, at least 99% of theoretical density, and at least 99.5% of theoretical density.

As an option, the method comprises subjecting the cemented carbide article to liquid phase sintering at a temperature between 1300° C. and 1350° C. for between 2 and 15 min in a vacuum or protective atmosphere. As a further option, the method comprises subjecting the cemented carbide article to liquid phase sintering at a temperature between 1300° C. and 1350° C. for between 2 and 15 min in a vacuum or protective atmosphere and hot isostatic pressing the cemented carbide article in argon at a pressure between 0.5 and 10 MPa.

The additive manufacturing process is optionally selected from any of direct metal laser sintering (DMLS), selective laser sintering (SLS), and electron beam melting (EBM).

The granules optionally comprise carbides, carbonitrides and/or nitrides of metals selected from the group of Ti, V, Mn, Zr, Nb, Mo, Hf, Ta and/or these metals in the form of solid solution in the binder.

The granules optionally comprise metals selected from the group of Re, Os, Ir, Ce, Y, Cu.

The method optionally further comprises disposing a layer of polycrystalline diamond, PCD, on a surface of the cemented carbide article.

According to a second aspect, there is provided a granular precursor material for use in fabricating a cemented carbide article by additive manufacturing, granular precursor material comprising granules, the granules comprising carbide grains and a binder comprising any of cobalt, nickel and iron, and wherein each granule has a density of at least 99.5% of the theoretical density and the granules of the precursor material have a mean compressive strength of at least 40 MPa.

As an option, each granule of the precursor material has a density selected from any of at least 99.7% of the theoretical density, at least 99.9% of the theoretical density, and 100% of the theoretical density.

As an option, which the granules of the precursor material have a mean compressive strength selected from any at least 60 MPa, and at least 100 MPa.

As an option, the granules of the precursor material have sizes selected from any of between 20 microns and 200 microns, between 30 microns and 120 microns, and between 40 microns and 90 microns.

BRIEF DESCRIPTION OF THE DRAWINGS

Non-limiting example arrangements to illustrate the present disclosure are described with reference to the accompanying drawings, in which.

DETAILED DESCRIPTION

Figures 1, 2:
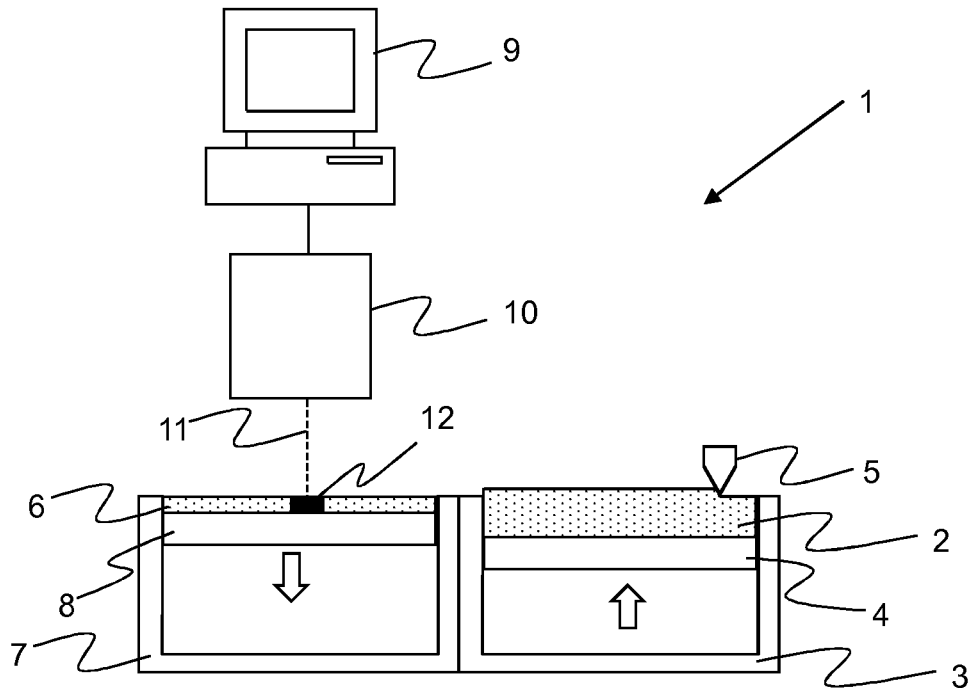
FIG. 1 illustrates schematically in a block diagram an exemplary additive manufacturing apparatus.
FIG. 2 is a flow diagram showing exemplary steps to manufacture a cemented carbide article.

Turning to FIG. 1, there is illustrated an exemplary additive manufacturing apparatus 1. A feed powder 2 is located in a feed container 3 on a movable feed platform 4. A rake arm 5 periodically sweeps over the top of the feed powder 2 to push a thin layer of powder 6 into a building container 7. The powder 6 in the building container 7 sits on a moveable building platform 8.

A computer 9 controls an energy source 10 to direct energy onto the layer of powder 6. The energy may be provided by any suitable source, such as a laser or an electron beam. In this example, the energy is a laser 11. The operation may be performed in an inert environment.

The laser 11 is scanned over the powder 6 on the building platform and provides a short pulse of, for example, 0.5 to 25 ms. This energy melts the powder 6 in a very small region and starts to build up an article 12 in the powder. The laser 11 moves over a raster according to instructions sent by the computer 9. Once the laser 11 has scanned over the raster in a vertical direction, the building platform indexes downwards by a distance of a required powder thickness. The rake arm 5 sweeps powder from the feed container 3 and into the building container 7 and the feed platform 4 indexes upwards by the distance of the required powder thickness, ready to provide powder for the next layer of additive manufacturing. In this way, articles 12 having a complex shape can be built up. Once the operation has been completed and the article 12 created, excess powder is removed from the article 12, and may be recycled in a new operation.

As mentioned above, additive manufacturing is typically used for single phase materials such as metals and alloys, because composite materials such as cemented carbides only partially melt in the short times of application of energy, and it is difficult to achieve full densification.

It has now surprisingly been found that fully sintered granules of carbide grains in a binder can be used for the fabrication of high-density cemented carbide articles by additive manufacturing. In order to do this, the granules require a high density close to the theoretical density and a high compressive strength. The theoretical density is the density of a 'perfect' material with no porosity.

The densification of fully sintered granulates to obtain high-density articles can be achieved in the short times of applying high energy required during an additive manufacturing process. Due to the high compressive strength of the granules, high-energy electron or laser beams can be employed during an additive manufacturing process without significant risk of damage, destroying or "explosion" of such granules that could otherwise be induced by thermal shock. Furthermore, it has been found that the use of fine cemented carbide granules of below 200 μm in size allows them to be sintered rapidly during an additive manufacturing process so that a cemented carbide article 12 prepared by additive manufacturing has a high density compared to the theoretical density.

The techniques described above may be used for any type of carbide grains in a binder, and have particular application where the carbide grains are tungsten carbide and the binder is based on cobalt, nickel, iron, or a mixture of those metals.

FIG. 2 is a flow diagram showing exemplary steps for manufacturing a cemented carbide article by additive manufacturing. The following numbering corresponds to that of FIG. 1:

S1. A precursor material of cemented carbide in the form of granules is provided. The granules comprise carbide grains dispersed in a binder. The binder comprises materials such as cobalt, nickel and iron, either alone or in any combination. Each granule has a density of at least 99.5% of the theoretical density, and the granules of the precursor material have a mean compressive strength of at least 40 MPa. Higher compressive strength, such as at least 60 MPa or at least 100 MPa may give improved properties. Granules of the precursor material typically have sizes between 20 μm and 200 μm. Sizes of between 30 μm and 120 μm, and between 40 μm and 90 μm may be preferred in some applications. The size of the granules shouldn't be much greater than each layer during the additive manufacturing process, to ensure that when the rake arm 5 spreads powder from the feed container 3 to the building container 7, the granules are spread evenly and do not drag or get stuck between the rake arm 5 and the container walls. For example, if each desired layer is 100 μm in thickness, the maximum granule size should not be much more than 100 μm. Note that the granules can be slightly larger than the layer thickness because each layer is compacted during the process owing to the temperature of the process in forming a cake, and an increase from the granule density to the final article density.

S2. An additive manufacturing process is used to manufacture the article by building up successive layers of material derived from the precursor material. This may involve a high-energy electron beam or laser pulses. The energy is sufficient to melt the binder phase but not the carbide phase, which allows full densification to be achieved in the article 12. Once the article 12 has been manufactured, excess powder is removed and can be recycled in a further operation.

There are several ways in which precursor material granules with the required properties may be prepared.

Figure 3:
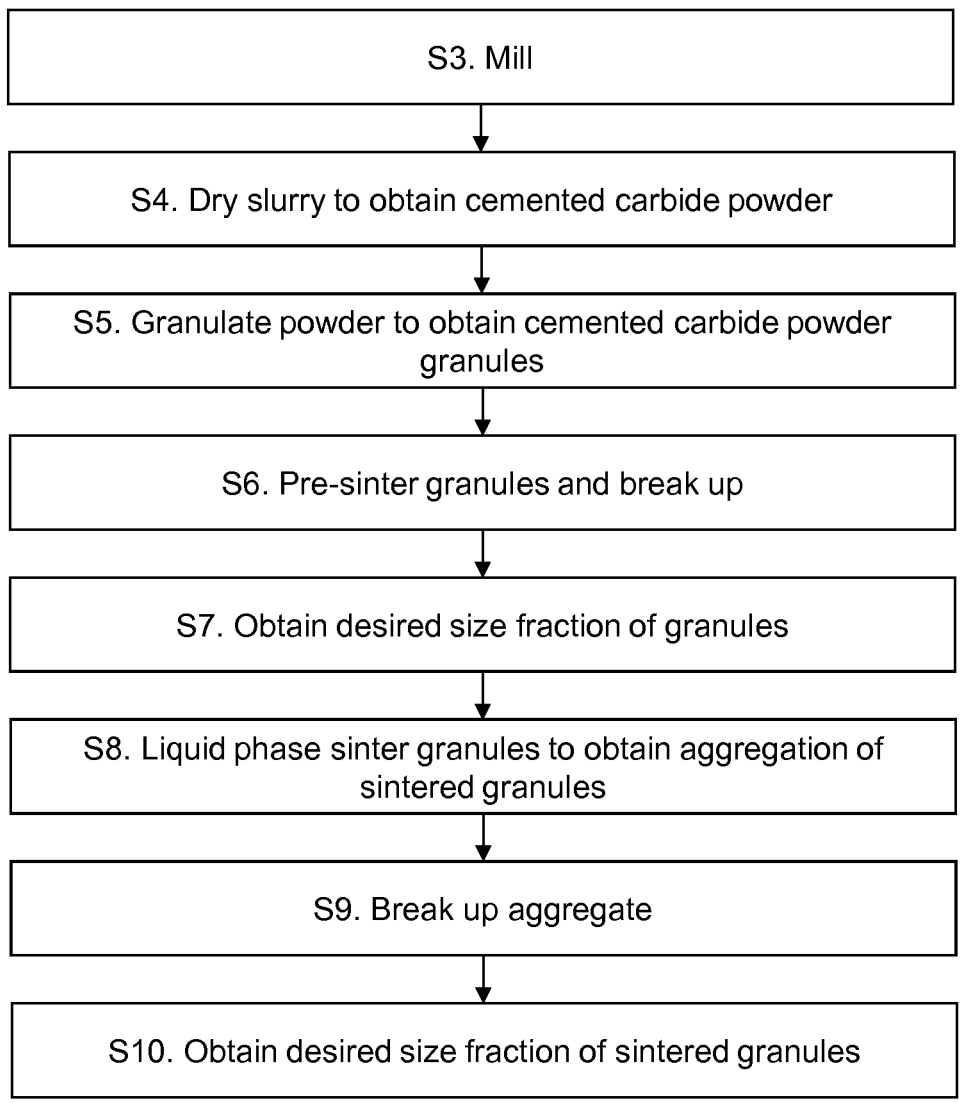
FIG. 3 is a flow diagram illustrating exemplary steps for a first exemplary method of preparing precursor material granules.

FIG. 3 is a flow diagram illustrating exemplary steps for a first exemplary method of preparing precursor material granules. The following numbering corresponds to that of FIG. 3.

S3. A cemented carbide powder mixture is milled in an organic fluid with a plasticizing agent to obtain a slurry. Milling is performed to obtain a desired particle size and an intimate mixture between a carbide powder and a binder. Where the binder is a metal or alloy, such as cobalt, the energy of the milling 'smears' the binder over the carbide grains to ensure an intimate mixture.

S4. The slurry is dried to obtain a cemented carbide powder.

S5. The cemented carbide powder is granulated to obtain cemented carbide granules. Note that steps S4 and S5 can be performed together in a spray drying operation.

S6. A pre-sintered granulated powder is obtained by solid-state sintering the granules at a temperature between 1000° C. and 1250° C. for between 1 and 60 minutes in a vacuum or protective atmosphere. Pre-sintering improves the mechanical strength of the granules, which allows easier handling. The pre-sintered granulated powder is then broken up into smaller granules.

S7. The pre-sintered granules are screened to obtain a desired fraction of the pre-sintered granules. The desired fraction may include a maximum particle size, a minimum particle size and an average particle size to aid powder handling. The screening may be performed by sieving, and the granule size may be, for example, between 40 and 100 μm.

S8. The pre-sintered granules are liquid-phase sintered at a temperature between 1260° C. and 1330° C. for between 2 and 20 min in a vacuum or protective atmosphere to obtain an aggregation of sintered granules. Note that the granules are almost fully sintered, but it is undesirable for the aggregation to be fully sintered as this makes subsequently breaking them up more difficult.

S9. The aggregations are broken up to obtain separate fully sintered precursor material granules.

S10. The almost fully sintered precursor material granules are screened to obtain a desired fraction for the additive manufacturing process. Again, the desired fraction may include a maximum particle size to ensure that granules are evenly moved by the rake arm 5 during the additive manufacturing process, and may include a minimum particle size and an average particle size to allow for powder handling. The maximum particle size may also be required because granules that are too large may not fully sinter during the additive manufacturing process. The screening may be performed by sieving, and the granule size may be, for example, between 40 and 100 μm. The precursor material granules have the required properties to be used in an additive manufacturing process as described above.

Figure 4:
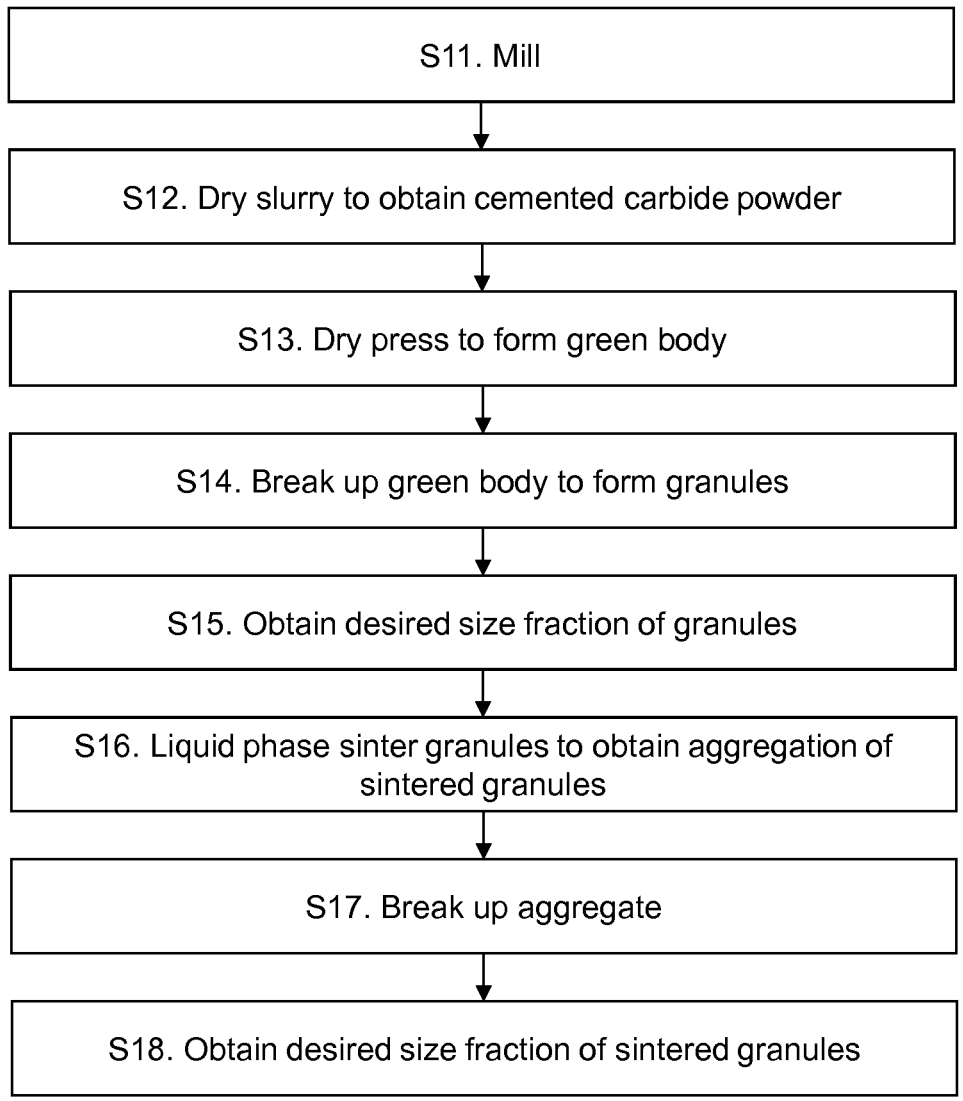
FIG. 4 is a flow diagram illustrating exemplary steps for a second exemplary method for preparing precursor material granules.

FIG. 4 is a flow diagram illustrating exemplary steps for a second exemplary method for preparing precursor material granules. The following numbering corresponds to that of FIG. 4.

S11. A cemented carbide powder mixture is milled as described in step S3 above.

S12. The slurry is dried as described in step S4 above.

S13. The dried powder is dry pressed without a binder to form a green body.

S14. The green body is broken up by light milling to form granules.

S15 to S18. Further processing of the granules is performed in the same way as steps S7 to S10 described above.

Figure 5:
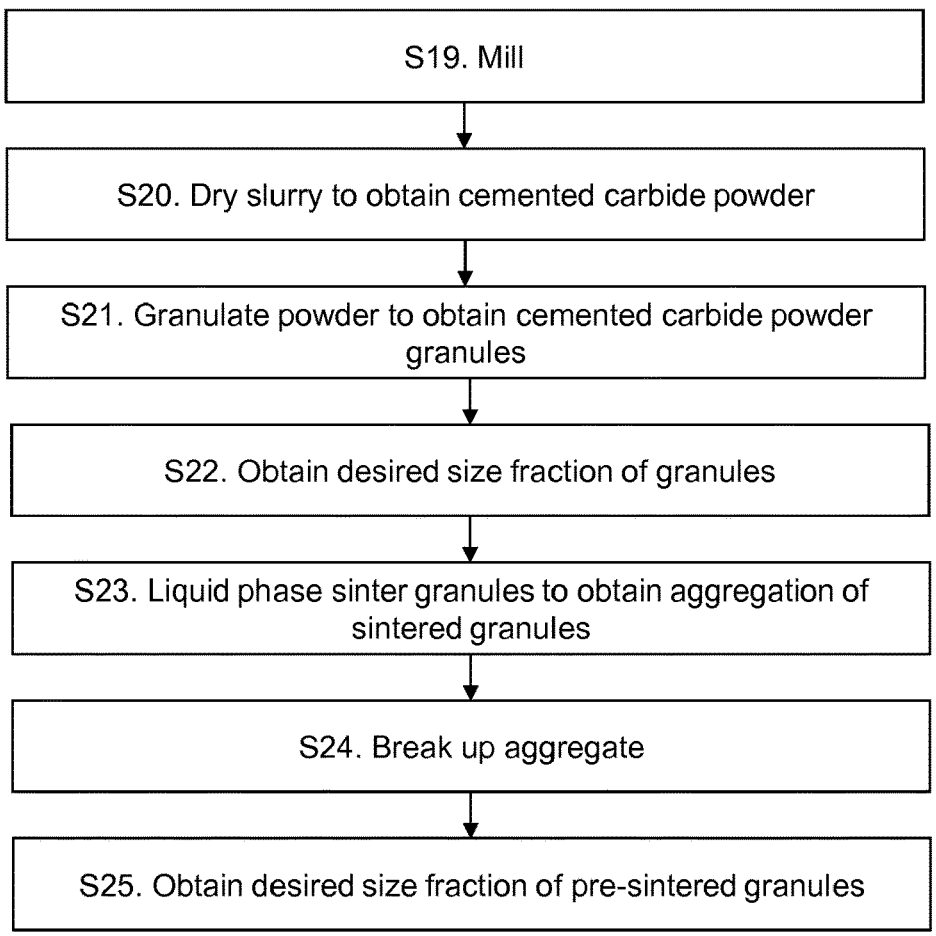
FIG. 5 is a flow diagram illustrating exemplary steps for a third exemplary method for preparing precursor material granules.

FIG. 5 is a flow diagram illustrating exemplary steps for a third exemplary method for preparing precursor material granules. The following numbering corresponds to that of FIG. 3.

S19. A cemented carbide powder mixture is milled as described in step S3 above.

S20. The slurry is dried as described in step S4 above.

S21. The dried powder is granulated as described in step S5 above.

S22. The granules are sieved to obtain a desired size fraction as described in step S7 above.

S23 to S25. Further processing of the granules is performed in the same way as steps S8 to S10 described above.

The skilled person will appreciate that other known powder preparation techniques may be used to obtain cemented carbide granules with the required properties for use in additive manufacturing.

The following examples show how the precursor granule materials can be prepared and subsequently used in an additive manufacturing process.

Example 1

A production batch of a WC—Co powder (200 kg) was made by milling together 174 kg of a WC powder and 26 kg of Co powder. The WC powder had a mean grain size of 1.3

µm. The Co powder had a mean grain size of around 1 µm. In addition, 4 kg of paraffin wax in alcohol was added. These components were milled together in an attritor-mill with 1000 kg carbide balls for 3 hrs.

After milling, the resultant slurry was dried at a temperature of around 90° C. The powder mixture was granulated by rolling in a rotating drum at a temperature of about 80° C. by use of a unit from Netzsch™. The resultant granules were sieved to a grain size fraction varying from 40 to 400 µm.

The sieved granules were placed into a graphite box of 50×50×10 cm to a maximum height of about 10 cm and pre-sintered at a temperature of 1080° C. for 30 minutes. The pre-sintered granules were sieved to the grain size fraction varying from 50 to 100 µm.

The pre-sintered and sieved granules were placed into a graphite box and finally sintered at a temperature of 1310° C. in vacuum for 45 min and afterwards in argon at a pressure of 50 bar (hot isostatic pressing) for 30 minutes. After the final sintering the granules formed a "sinter cake" consisting of aggregated granules. The aggregated granules were broken up by light milling. The resultant sintered granules were first sieved through a sieve with a size of 500 µm. Then the sintered granules were sieved to the grain size fraction varying from 60 to 100 µm.

Figure 6:
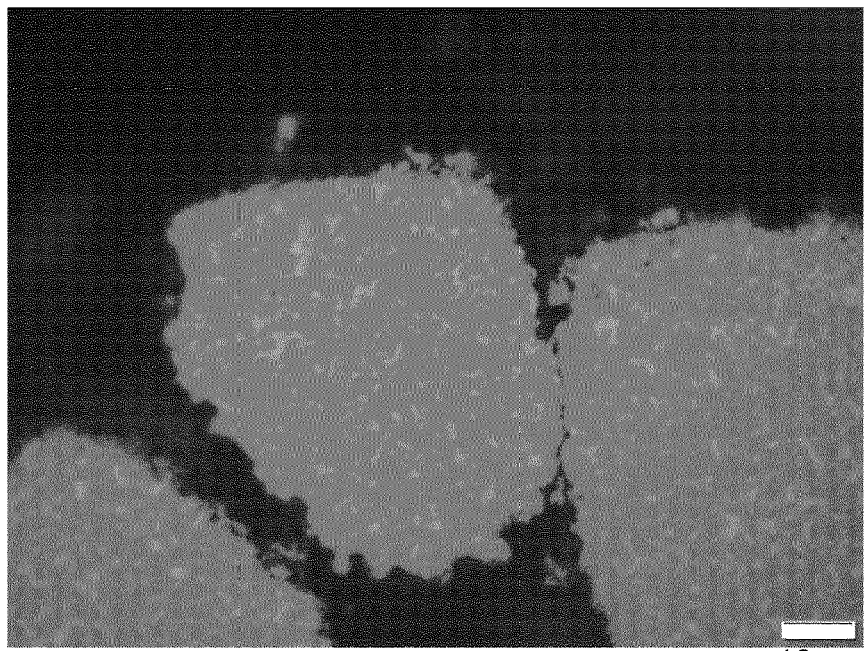
FIG. 6 is a micrograph showing exemplary sintered precursor granules.

FIG. 6 shows the microstructure of a cross-section of granules produced as described above. It can be seen that the granule was sintered to almost the theoretical density, as no porosity is visible on the cross-section. The temperature was high enough to fully densify the granules, but not too high in order to prevent their sintering together.

A sample of five granules was randomly selected for destructive mechanical testing. Each granule was placed on a rigid stage and a rigid plate was slowly pressed against the granule at a constant speed, thus compressing it with a force increasing from 50 millinewtons (mN) up to a maximum of 2,000 Newtons (N), until the granule broke. Since the mechanical properties of each granule are partly dependent on the size of the granule, the tested granules all had a diametrical size of 100 to 120 µm. The mean compressive strength of the granules was found to be 270±50 megapascals (MPa).

The granules were employed for fabrication of cylinders of about 15 mm in diameter and about 10 mm in height by using an electron beam melting additive manufacturing process at a current of 30 mA and an electron beam speed of 5 m/s. Before performing the additive manufacturing process, a 2 mm thick layer of granules was located on a plate of WC-20% Co cemented carbide of 100×100×10 mm in size, which was pre-heated by the electron beam to a temperature of 1100° C. When the additive manufacturing process was completed, non-sintered granules among the sintered carbide articles were removed by blowing them away using compressed air. The sintered articles had a density of 14.0 g/cm$^3$, which corresponds to 98.6% of the theoretical density. The sintered articles had a coercive force of 10.5 kA/m, a magnetic moment of 18.2 Gcm$^3$/g, a hardness of 1190 Vickers units and a fracture toughness of 14.0 MPa m$^{1/2}$.

After consequent grinding, the sintered cylinders were employed as substrates for polycrystalline diamond (PCD) obtained by press-sintering under high-pressure high-temperatures (HPHT) conditions. When the HPHT press-sintering was completed, a sample of one carbide cylinder was cut off and examined. It was found that its density was 14.24 g/cm$^3$, which corresponds to the 100% density. The coercive force decreased to 10.1 kA/m, the magnetic moment decreased to 17.8 Gcm$^3$/g, the hardness increased to 1290 Vickers units and the fracture toughness increased to 14.2 MPa m$^{1/2}$.

Example 2

A carbide cylinders fabricated by the additive manufacturing process described in Example 1 was subjected to liquid-phase sintering at a temperature of 1320° C. for 2 minutes in a vacuum plus 10 minutes hot isostatic pressing in argon at a pressure of 40 Bar. It was found that its density was 14.22 g/cm$^3$, which corresponds to 100% density (the theoretical density of 14.2±0.1 g/cm$^3$). The coercive force decreased to 10.4 kA/m, the magnetic moment decreased to 18.1 Gcm$^3$/g, the hardness increased to 1220 Vickers units and the fracture toughness increased to 14.1 MPa m$^{1/2}$.

In the examples above, the desired grain size was obtained by sieving the granules through sieves of known mesh sizes to ensure that no large granules are present. These could lead to powder handling issues and sintering issues.

Various example embodiments of cemented carbides, methods for producing cemented carbides, and tools comprising cemented carbides have been described above. Those skilled in the art will understand that changes and modifications may be made to those examples without departing from the scope of the appended claims. For example, the above examples refer to cemented tungsten carbide articles, but it will be appreciated that the same techniques may be applied to other types of cemented carbide articles.

The invention claimed is:

1. A method of fabricating a cemented carbide article by additive manufacturing, the method comprising:
   1) providing a granular precursor material comprising granules, the granules comprising carbide grains and a binder comprising any of cobalt, nickel and iron, and wherein each granule has a density of at least 99.5% of a theoretical density and the granules of the precursor material have a mean compressive strength of at least 40 megapascals, MPa;
   2) forming a layer of the precursor material atop a moveable platform;
   3) delivering a pulse of an electron or laser beam to the layer of the precursor material to melt at least a portion of the precursor material and form a layer of material derived from the precursor material; and
   4) repeating steps 2) and 3) to build up successive layers of material derived from the precursor material.

2. The method as claimed in claim 1, in which each granule of the precursor material has a density of at least 99.7% of the theoretical density, at least 99.9% of the theoretical density, or 100% of the theoretical density.

3. The method as claimed in claim 1, in which the granules of the precursor material have a mean compressive strength selected from any at least 60 MPa, and at least 100 MPa.

4. The method as claimed in claim 1, in which the granules of the precursor material have sizes selected from any of between 20 microns and 200 microns, between 30 microns and 120 microns, and between 40 microns and 90 microns.

5. The method as claimed in claim 1, in which providing the granules of the precursor material comprises:
   milling a cemented carbide powder mixture in an organic fluid with a plasticizing agent to obtain a slurry;
   drying the slurry to obtain a cemented carbide powder;

granulating the cemented carbide powder to obtain cemented carbide granules;

solid-state sintering the granules at a temperature between 1000° C. and 1250° C. for between 1 and 60 min in a vacuum or protective atmosphere to obtain a pre-sintered granulated powder;

screening the pre-sintered granules to obtain a required size fraction of the pre-sintered granules;

liquid-phase sintering the pre-sintered granules at a temperature between 1260° C. and 1330° C. for between 2 and 20 min in a vacuum or protective atmosphere to obtain an aggregation of fully sintered granules;

breaking up the aggregation to obtain separate fully sintered granules;

screening the fully sintered granules to obtain a required size fraction.

6. The method as claimed in claim 5, further comprising spray drying the slurry to dry and granulate the cemented carbide granules.

7. The method as claimed in claim 5, further comprising granulating the cemented carbide powder by use of rolling in a rotated drum at a temperature above 50° C.

8. The method as claimed in claim 5, further comprising, subsequent to sintering the pre-sintered granules, hot isostatic pressing the fully sintered granules in argon at pressure of between 0.5 and 10 MPa.

9. The method as claimed in claim 1, in which providing the granules of the precursor material comprises:

milling a cemented carbide powder mixture in an organic fluid with a plasticizing agent to obtain a slurry;

drying the slurry to obtain a cemented carbide powder;

pressing the cemented carbide powder to form a green body;

breaking up the green body for form green body granules;

screening the green body granules to obtain a required size fraction of the green body granules;

sintering the green body granules at a temperature between 1260° C. and 1330° C. for between 2 and 20 min in a vacuum or protective atmosphere to obtain an aggregation of fully sintered granules;

breaking up the aggregation to obtain separate fully sintered granules;

screening the fully sintered granules to obtain a required size fraction.

10. The method as claimed in claim 1, in which providing the granules of the precursor material comprises:

milling a cemented carbide powder mixture in an organic fluid with a plasticizing agent to obtain a slurry;

drying the slurry to obtain a cemented carbide powder;

granulating the cemented carbide powder to obtain cemented carbide granules;

screening the granules to obtain a required size fraction of the granules;

sintering the granules at a temperature between 1260° C. and 1330° C. for between 2 and 20 min in a vacuum or protective atmosphere to obtain an aggregation of fully sintered granules;

breaking up the aggregation to obtain separate fully sintered granules;

screening the fully sintered granules to obtain a required size fraction.

11. The method as claimed in claim 1, in which the cemented carbide article has a density selected from any of at least 97% of theoretical density, at least 98% of theoretical density, at least 99% of theoretical density, and at least 99.5% of theoretical density.

12. The method as claimed in claim 1, further comprising subjecting the cemented carbide article to liquid phase sintering at a temperature between 1300° C. and 1350° C. for between 2 and 15 min in a vacuum or protective atmosphere.

13. The method as claimed in claim 12, further comprising subjecting the cemented carbide article to liquid phase sintering at a temperature between 1300° C. and 1350° C. for between 2 and 15 min in a vacuum or protective atmosphere; and hot isostatic pressing the cemented carbide article in argon at a pressure between 0.5 and 10 MPa.

14. The method as claimed in claim 1, in which the additive manufacturing process comprises any of direct metal laser sintering, selective laser sintering, and electron beam melting.

15. The method as claimed in claim 1, wherein the granules comprise metals selected from the group of Ti, V, Mn, Zr, Nb, Mo, Hf, and Ta.

16. The method according to claim 1, wherein the granules comprise metals selected from the group of Re, Os, Ir, Ce, Y, Cu.

17. The method according to claim 1, further comprising disposing a layer of polycrystalline diamond, PCD, on a surface of the cemented carbide article.

18. The method according to claim 1, wherein forming a layer of the precursor material atop a moveable platform comprises sweeping a rake arm over a top of the precursor material positioned on a feed platform to push a thin layer of the precursor material onto the moveable platform.

19. The method according to claim 18, wherein subsequent to step 3, the method further comprises moving the moveable platform downward and moving the feed platform upward by an amount corresponding to a thickness of the layer of precursor material formed atop the moveable platform.

20. The method according to claim 1, wherein the pulse of the electron or laser beam delivered to the layer of the precursor material is between 0.5 to 25 ms.

21. The method according to claim 1, wherein the additive manufacturing is performed in an inert environment.

\* \* \* \* \*